G. L. WALKER.
GEAR SHIFTING DEVICE.
APPLICATION FILED MAR. 11, 1916.
1,300,676.
Patented Apr. 15, 1919.
2 SHEETS—SHEET 2.
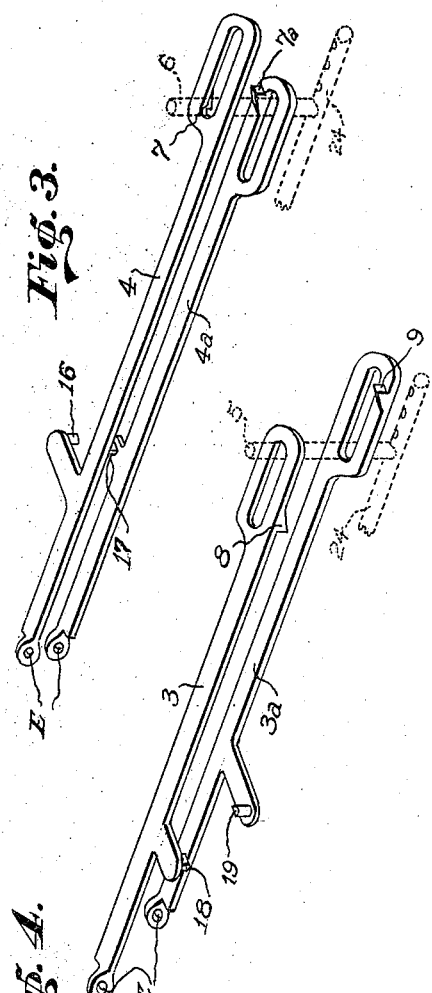
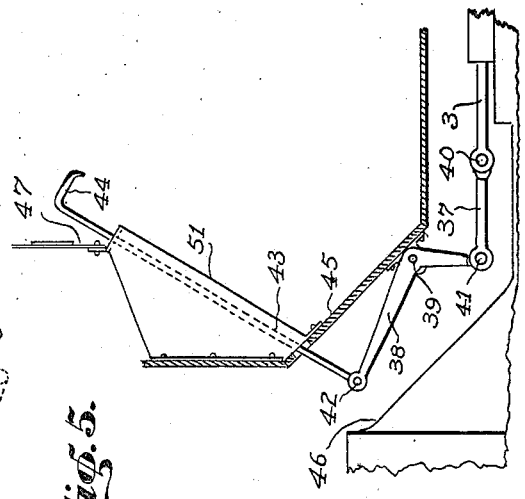
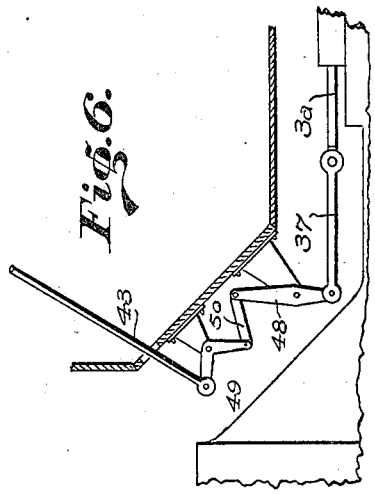
INVENTOR
George Leslie Walker
BY
W. W. Boughton
ATTORNEY

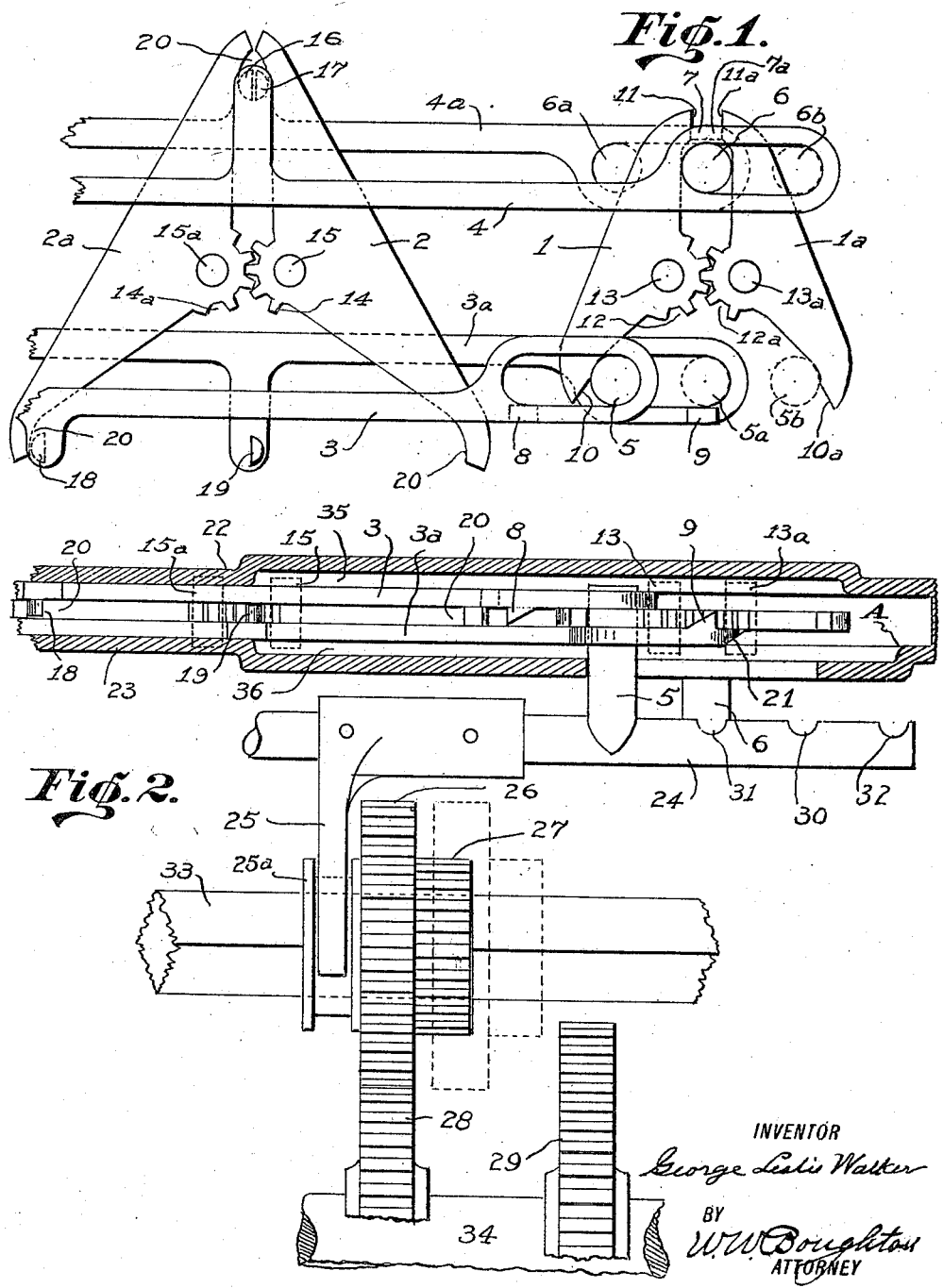

UNITED STATES PATENT OFFICE.

GEORGE LESLIE WALKER, OF PUEBLO, COLORADO.

GEAR-SHIFTING DEVICE.

1,300,676. Specification of Letters Patent. Patented Apr. 15, 1919.

Application filed March 11, 1916. Serial No. 83,455.

*To all whom it may concern:*

Be it known that I, GEORGE LESLIE WALKER, a citizen of the United States, and a resident of Pueblo, in the county of Pueblo and State of Colorado, have invented a certain new and useful Improvement in Gear-Shifting Devices, of which the following is a full, clear, and exact description.

My invention is an improvement in gear shifting devices for automobiles. The principal objects of the invention are the provision of a structure obviating the necessity of a gear shifting lever in the driver's compartment of the machine, thus permitting ready access to that compartment from either side, to provide a device by which the gears may be shifted into low, intermediate, high or reverse by the same kind of a movement by the operator, to preclude the necessity of the operator passing a lever through a neutral slot or in any other manner accounting for neutral, and to provide automatic means for returning any gear which has been in mesh to neutral before another gear is shifted.

To attain these purposes my invention, broadly stated, comprises two pairs of slotted links, each pair operating on a single pin which is mounted on one gear shifting rod (the one of said links serving to pull and the other to push said pin), means for transmitting motion from one set of links to the pin of the other set, means for transmitting motion from one set of links to the other set of links and means for operating the links. These mechanisms are so shaped and designed (as will later more clearly appear in this specification) that, if one link is operated to throw its associated gear into mesh at a time when another gear is already in mesh, the latter gear will first be thrown out and into neutral position prior to the beginning of the shifting action of the gear to be thrown in.

Further and more detailed objects and advantages of my invention will later appear in this specification.

In the two sheets of drawings accompanying this application and forming a part hereof Figure 1 is a plan view of those moving parts of my invention which are contained in the gear shifting mechanism housing, the position illustrated being that taken when one set of gears is in mesh;

Fig. 2 is a side elevation of the parts shown in Fig. 1 together with a portion of an automobile transmission, the gear shifting mechanism housing appearing in vertical section;

Fig. 3 is a perspective view on a reduced scale showing the slotted links 4 and 4ª of Fig. 1 in the same position as there illustrated;

Fig. 4 is a similar view of the other pair of slotted links 3 and 3ª;

Fig. 5 is a side view, a portion of the automobile body appearing in vertical section, of a pull rod and its connections for operating one of that pair of slotted links which depend on a pulling action for their operation; and Fig. 6 is a similar view of a pull rod and its connections for operating one of that pair of slotted links which depend on a pushing action for their operation.

Referring to the drawings, in which like reference characters indicate like parts in the several views, 1 and 1ª indicate a pair of symmetrical, inter-geared shifting members for imparting cross movement from one set of slotted links to the opposite gear shifting pin and 2 and 2ª indicate a pair of symmetrical, inter-geared shifting members for imparting cross movement from one set of slotted links to the other. These slotted links are arranged in superimposed pairs, 3 and 3ª indicating one pair and 4 and 4ª indicating the other pair and the shifting members 2, 2ª are long enough to extend across the shanks of the links 3, 3ª, 4 and 4ª, as is clearly shown in Fig. 1, so that the shifting members are always in position to engage lugs carried by the links as will later more fully appear. The numerals 5 and 6 indicate pins each rigidly connected to one of a pair of gear shifting rods (in a manner later to be described), the numerals 5ª, 5ᵇ, 6ª, and 6ᵇ being used to designate dotted line or shifted positions of the pins 5 and 6, respectively.

The slotted links 3 and 4 carry on their under surfaces depending lugs 8 and 7, respectively, these lugs being inclined on their rear surfaces as shown and having vertical front faces, and the links 3ª and 4ª have on their upper surfaces corresponding, oppositely inclined lugs 9 and 7ª respectively. These lugs are all located on the outer sides of the loop-shaped portions of the slotted links; and on arms projecting from outer sides of the shaft portions of the links 3, 3ª, 4, 4ᵃ, there are located the lugs 16, 17, 18, and 19, the purposes of all of which will be later described.

The shifting members 1 and 1ᵃ are shaped as shown in Fig. 1, having intermeshing gear teeth 12 and 12ᵃ thereon and the members are pivoted at 13 and 13ᵃ, respectively, in a housing comprising upper and lower plates 22, 23. The shifting members 2 and 2ᵃ are likewise geared together by the teeth 14, 14ᵃ and pivoted in the housing on pins 15, 15ᵃ.

In Fig. 2 I have illustrated only so much of the contents of the ordinary gear shifting case as will be necessary to understand the application of my invention thereto, my invention contemplating no change whatever in this part of the standard installation. In this figure 24 is the usual gear shifting rod carrying rigidly secured thereto a yoke 25 adapted to straddle a sleeve 25ᵃ rigidly connected to the gears 26, 27 which gears are slidably mounted on the transmission square shaft 33. Reciprocation of the rod 24, therefore, is adapted to bring either gear 26 into mesh with gear 28 on the engine shaft 34 or gear 27 into mesh with gear 29 on the engine shaft; or into an intermediate neutral position indicated in dotted lines in Fig. 2. Motion is adapted to be transmitted to the rod 24 through the pin 5 previously described, which pin forms an element of my device. It will of course be understood that another rod 24, similarly connected to another pair of gears, is connected to the pin 6, this rod being hidden in the view taken. Through these two rods 24 my device is adapted to control the position of the gears in the gear case in a manner later to be described.

As will be seen from Figs. 3 and 4, the inner ends of the slotted links 3, 3ᵃ, 4 and 4ᵃ are provided with eyes E adapted to connect them with the actuating mechanism located adjacent the dash 47 or in some other position convenient to the driver. Such mechanism may conveniently consist of pull rods 43 provided with handles 44, each handle having appropriate designations thereon or adjacent thereto to show which gear will be brought into mesh by pulling the handle. But, as will later be made clear, the links 3 and 4 only are made effective by a forward or pulling action while the links 3ᵃ and 4ᵃ depend on a pushing action for carrying out their functions. Therefore, if the handles 44 are to operate by a pull, as is of course desirable, a different form of mechanical movement must be arranged for 3ᵃ and 4ᵃ than will apply to 3 and 4. These connections are illustrated in Figs. 5 and 6 respectively. In Fig. I have shown the form which I prefer to use with the links 3 and 4. This combination comprises a link 37 connected at one end to the eye E of 3 by a pin 40 and at its other end by a pin 41 to the bell crank lever 38 pivoted at 39 to the lower side of the foot-board 45. A pivot pin 42 connects the bell crank lever 38 to a pull rod 43 which carries at its upper end the handle 44, the handle being shown in its upper or raised position in Fig. 5.

Where, as is the case with the links 3ᵃ and 4ᵃ, it is desired that a pull on the handle shall be transmitted as a push on the slotted link, a chain of mechanism such as shown in Fig. 6 may be employed. Here a link 37 connects the slotted link 3ᵃ with one end of a centrally pivoted rocking lever 48, the other end of which is connected to a bell crank lever 49 by a drag link 50. A pull on this rod 43 will therefore be transmitted as a push to the slotted link 3ᵃ (or its like element 4ᵃ).

*Operation.*

In describing the operation of my device it will be simpler to first describe the condition where a shift is to be made between two sets of speed gears actuated by the same rod 24—as, for instance, from intermediate to high. For this purpose we will assume that the gears 26 and 28 represent intermediate and 27 and 29 represent high, the positions of the parts illustrated, therefore, being when the gears are set at intermediate. A pull on the rod 43 of Fig. 6 will be transmitted as a push to the slotted link 3ᵃ which will engage the pin 5, thus first pushing 26 out of mesh and therefore to neutral, as indicated by the dotted line position in Fig. 2 (the pin 5 now being in position 5ᵃ), and a further pull will shift 5 to position 5ᵇ in which position 27 and 29 intermesh. During this movement the link 3 (which had previously been operated to set the intermediate gears and whose handle 44 was therefore in raised position) is retraced by the engagement of its outer end with the pin 5 and, through the train of mechanism previously described, the handle 44 is returned to lowered position. During such a shift, furthermore, the members 1, 1ᵃ, 2, and 2ᵃ are not moved since the wings of both are in open position on the side where the movement is induced—in other words, since the other side of the shifting mechanism is all in neutral position.

For the next case we will assume that, instead of the high speed handle having been pulled, it was the low; and for purposes of illustration we will assume that the link 4 controls this gear, and that the parts at the time of this movement are in the position shown in the drawings, with intermediate in gear. The first result of a pull on 4 will be the engagement of lug 7 with the face 11 of the member 1 and lug 16 with the face 20 of the member 2ᵃ. Through the shifting of the member 1 and the reaction of its face 10 on the pin 5 this pin will be moved to 5$^a$ or neutral, this movement being accomplished before the outer end of the loop on 4 contacts with the pin 6. By the time the members 1 and 1$^a$ have come to closed position on the 5 side the lug 7 will clear the face 11 and a further pull on 4 will cause the outer end of its loop to transport 6 to 6$^a$ thus throwing in its assoicated gear. In the meantime the member 2$^a$ by engaging the lug 18 with its other face 20 has transported 3; so that while pin 5 has merely gone to the 5$^a$ position the link 3 has gone to the full limit of its travel—to a position corresponding to that previously occupied by 4; and for the reason that it may be the next link which it is desired to operate and that therefore it should be in the lost motion position to enable it to be pulled through some distance before coming into engagement with its pin 5 so that a corresponding movement may, if needed, be transmitted across to the 6 side to return some gear to neutral.

During the operation above described the lug 8 on the link 3 had to pass the adjacent end of the member 1—for that member would have been sufficiently moved before 8 reached it to be in the path of 8. This passing is permitted by the manner of mounting the slotted links illustrated in Fig. 2 where it is shown that the shaft portions of these links are closely fitted in and guided between the plates 22 and 23 but that the loop portions of the links are incased in recessed portions of the casing and therefore normally provided with spaces 35, 36, above them, respectively. Therefore, when the inclined face of the lug 8 strikes the member 1, the link 3 will be deflected into the space 35 by the surface of 8 riding on the member 1 and as soon as the lug 8 has passed the member 1 the spring character of the links will cause the link to snap back into place. Furthermore, on account of the members 1 and 1$^a$ and 2 and 2$^a$ being geared together, at the end of this movement the parts on the 5 side will now present the same arrangement and positions as that illustrated in the drawings for the 6 side. The members 1 and 1$^a$ are so shaped that in closed position there is space between their faces 10 and 10$^a$ and 11 and 11$^a$ for the reception of a pair of the lugs 7, 7$^a$, 8 and 9, pairs of these lugs being superimposed on their inclined faces. In order to insure that the lower members 3$^a$ and 4$^a$ of the pairs of slotted links shall ride up the surfaces A at the outer end of their travel I prefer to bevel the outer ends of said links as shown at 21 in Fig. 2.

We will now assume the remaining case; that where 4$^a$, one of the push links, is to be operated from the position of parts shown in Figs. 1 and 2 (where the gear operated by the opposite rod is in mesh). The first action will be the engagement of lug 7$^a$ with the face 11$^a$ of the member 1$^a$ and lug 17 with the member 2. The turning movement of 1$^a$ will be transmitted to 1 through the gearing 12, 12$^a$ and again the open side of the members 1, 1$^a$ will be closed and the pin 5 thus returned to neutral. The turning movement of 2 will be transmitted to 2$^a$ through the gearing 14, 14$^a$ and the end of 2$^a$ will engage 18 carrying 3 to the opposite limit of its movement, the lug 8 riding over 1 as previously described. The return of pin 5 to the 5$^a$ position occurs during the time that the loop portion of 4$^a$ was passing through the lost motion portion of its travel (prior to the engagement of its inner face with the pin 6) and therefore 5 is in neutral position before the loop portion of 4$^a$ engages pin 6 to shift it to the 6$^b$ position for meshing its gears.

If, when any gear is in mesh, it is merely desired to throw it out without throwing any other in (as, for instance, if in the position of parts illustrated in the drawings it were desired to return 5 to the 5$^a$ position without moving 6) the act of depressing the handle of the rod connected to that gear will properly return the parts to neutral and leave them in proper shape for later throwing any desired gear into mesh. In the case illustrated if the handle connected to 3 is forcibly lowered the first movement will be to take up the lost motion of the loop and a further depressing of the handle will cause the inner side of the loop to engage 5 returning it to the 5$^a$ position; in this case the members 1, 1$^a$, 2 and 2$^a$ will not be moved but will remain as they are.

It will of course be clear from the above description that where one gear shifting handle 44 is pulled at the time that another is out no separate act of returning the former is necessary as it will be automatically returned to lowered position through its corresponding slotted link having been returned as already described.

It will be obvious that with the mechanism described both pins 5 and 6 are always securely held from both sides by the actuating mechanism in any position—in the position shown 6 being held in neutral by the wings of 1 and 1$^a$ and 5 being held between the loop of 3 and the end of 1. But if desired the customary notches 30, 31, and 32 on the rod 24 adapted to coöperate with the usual spring pressed pin for retaining the rod 24 may also be provided.

For the sake of compactness of arrangement I prefer to mount two of the slotted links, as 3 and 4, over the members 1, 1$^a$, 2 and 2$^a$ and two of the links, as 3$^a$ and 4ª, below these members. Also for convenience in assembling I prefer to journal the pivots 13, 13ª, 15 and 15ª in sockets in the housing plates 22 and 23. But it will be obvious that changes in these and other details of the arrangement of my device may be made without departing from my invention and I do not therefore desire to be considered as limited to the precise structure shown further than is indicated by the appended claims.

In the claims I have employed the term "neutral" as applied to the pins 5 and 6 to indicate that position of the same which corresponds to neutral of the associated gears and as applied to the slotted links to indicate that position of the same from which they may be moved, through the lost motion provided by their slots, through a portion of their travel before engaging the corresponding pin.

Having thus described my invention what I claim and desire to secure by Letters Patent is:—

1. In combination with the two gear shifting rods of an automobile transmission, a pin rigidly attached to each rod, a pair of slotted links engaging each pin by their slots, and connections from each pair of links to the pin associated with the other pair of links for returning either pin to neutral position whenever the links associated with the other pin are operated.

2. In combination with the two gear shifting rods of an automobile transmission, a pin rigidly attached to each rod, a pair of slotted links engaging each pin by their slots, and connections from each pair of links to the other pair of links for returning the idle links and their coöperating pin to neutral position when the opposite set of links is operated.

3. In combination with the two gear shifting rods of an automobile transmission, a pin rigidly attached to each rod, a pair of slotted links engaging each pin by their slots, and connections between said pairs of links for returning the one pair to neutral when either link of the other pair is actuated.

4. In combination with a gear shifting rod of an automobile transmission, a pin rigidly attached to said rod, a pair of slotted links through the slots of which said pin is passed, means for exerting a pulling action on one of said links, and means for exerting a pushing action on the other of said links.

5. In combination with the two gear shifting rods of an automobile transmission, a pin rigidly attached to each rod, a pair of slotted links engaging each pin with their slots, means for exerting a pulling action on one of the links of each of said pairs of links, and means for exerting a pushing action on the other link of each of said pairs of links.

6. In combination with the two gear shifting rods of an automobile transmission, a pin rigidly attached to each rod, a pair of slotted links engaging each pin with their slots, a pair of intermeshing shifting members pivoted between the said pairs of links, and in position to engage said pins, and means on each link for engaging a portion of one of said shifting members for moving the same and the pin on the opposite side.

7. In combination with the two gear shifting rods of an automobile transmission, a pin rigidly attached to each rod, a pair of slotted links engaging each pin with their slots, a pair of intermeshing shifting members pivoted between the said pairs of links and in position to engage said pins, and a lug on each link in position to engage said shifting members, said lugs having each a vertical and an inclined face and being complementarily arranged with respect to said faces on each pair of links, the vertical face of each lug being in position to engage one of the shifting members when the link on which it is mounted is in neutral position.

8. In combination with the two gear shifting rods of an automibile transmission, a pin rigidly attached to each rod, a pair of slotted links engaging each pin with their slots, a pair of intermeshing shifting members pivoted between the said pairs of links and in position to engage said pins, and a lug on each link in position to engage said shifting members, but to pass them when the shifting members are in fully open position, said lugs having each a vertical and an inclined face and being complementarily arranged with respect to said faces on each pair of links, the vertical face of each lug being in position to engage one of the shifting members when the link on which it is mounted is in neutral position.

9. In combination with the two gear shifting rods of an automobile transmission, a pin rigidly attached to each rod, a pair of slotted links engaging each pin with their slots, a pair of intermeshing link shifting members pivoted between the said pairs of links and having their ends crossing the links, and a lug on each link in position to engage an end of one of said link shifting members.

10. In combination with the two gear shifting rods of an automobile transmission, a pin rigidly attached to each rod, a pair of slotted links engaging each pin with their slots, a pair of intermeshing link shifting members pivoted between the said pairs of links and having their ends extending across the same, and a lug on each link in position to engage an end of one of said link shifting members during the movement of its link toward or from neutral position.

11. In combination with the two gear shifting rods of an automobile transmission, a pin rigidly attached to each rod, a pair of oppositely operating slotted links engaging each pin with their slots, a pair of intermeshing link shifting members pivoted between the pairs of links and having their ends extending across the same, and a lug on each link in position to engage an end of one of said link shifting members, said lugs being so placed that the two on an associated pair of links will fall between the closed ends of said link shifting members when the links on which the lugs are mounted are in neutral position.

12. In combination with the two gear shifting rods of an automobile transmission, a pin rigidly attached to each rod, a pair of oppositely operating slotted links engaging each pin with their slots, a pair of intermeshing link shifting members pivoted between the pairs of links and having their ends crossing the links at one side of the slots therein, and a lug on each link in position to engage an end of one of said link shifting members, said lugs being so placed that the two on an associated pair of links will fall between the closed ends of said link shifting members when the links on which the lugs are mounted are in neutral position and that either will engage one of said shifting members to spread them on the side in question when the link on which the lug is mounted is moved to operative position.

13. In combination with the two gear shifting rods of an automobile transmission, a pin rigidly attached to each rod, a pair of slotted links engaging each pin, with their slots a pair of intermeshing pin shifting members pivoted between said pairs of links and in position to engage said pins with their extremities, a lug on each link in position to engage said pin shifting members when the latter are in closed position but to pass them when the shifting members are in fully open position, a pair of link shifting members pivoted between the pairs of links and having their ends crossing the links, and a lug on each link in position to engage an end of one of said link shifting members, said lugs being so placed that the two on an associated pair of links will fall between the closed ends of said link shifting members when the links on which the lugs are mounted are in neutral position and that either will engage one of said link shifting members to spread them on the side in question when the link on which the lug is mounted is moved to operative position.

14. In a gear shifting device, two gear shifting rods, a pin rigidly connected to each rod, a pair of slotted links straddling each pin, four pull rods, connections for actuating said links from said pull rods such that a pulling action thereon will be transmitted as a pull to one link of each pair and as a push to the other link of each pair, and connections from each link to the opposite pin whereby the said pin is returned to neutral before the link in question can engage its pin to shift the same.

15. In a gear shifting device, two gear shifting rods, a pin rigidly connected to each rod, a pair of slotted links straddling each pin, four pull rods, connections for actuating said links from said pull rods such that a pulling action thereon will be transmitted as a pull to one link of each pair and as a push to the other link of each pair, and connections from each link to the opposite pair of links whereby the moving of any one link to shift its coöperating pin will cause the opposite pair of links to be returned to neutral position.

16. In a gear shifting device, two gear shifting rods, a pin rigidly connected to each rod, a pair of slotted links straddling each pin, four pull rods, connections for actuating said links from said pull rods such that a pulling action thereon will be transmitted as a pull to one link of each pair and as a push to the other link of each pair, and connections from each link to the opposite pin and to the opposite set of links whereby the opposite pin is returned to neutral before the link in question can engage its pin to shift the same and whereby the moving of any one link to shift its coöperating pin will cause the opposite pair of links to be returned to normal position.

In testimony whereof I have hereunto affixed my signature.

GEORGE LESLIE WALKER.

Copies of this patent may be obtained for five cents each, by addressing the "Commissioner of Patents, Washington, D. C."